UNITED STATES PATENT OFFICE.

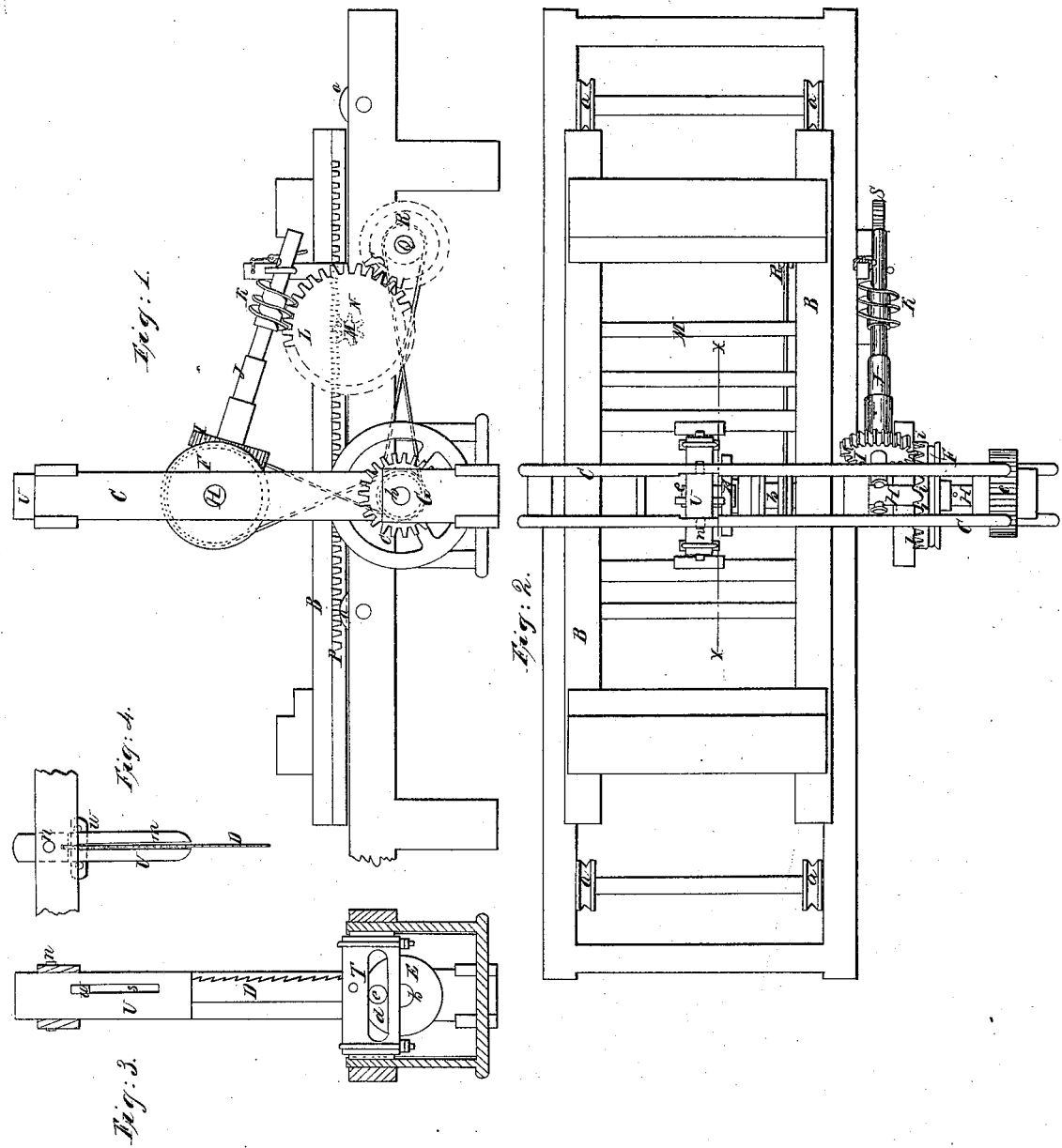

JOHN A. TAPLIN, OF FISHKILL, NEW YORK.

METHOD OF HANGING PATH-FINDING SAWS.

Specification of Letters Patent No. 12,170, dated January 2, 1855.

*To all whom it may concern:*

Be it known that I, JOHN A. TAPLIN, of Fishkill, in the county of Dutchess and State of New York, have invented certain new and useful Improvements in Portable Sawmills, of which the following is a full, clear, and exact description, reference being had to the accompanying drawings, which make part of this specification, and in which—

Figure 1 represents a side elevation; Fig. 2 a top view; Fig. 3 a section at the line $x$ $x$ of Fig. 2 showing the manner in which the saw is guided and driven; and Fig. 4 a sectional view, showing the pendulum block which guides the upper end of the saw.

The machine consists of a strong portable frame which supports the mechanism for driving the saw and feeding the log. The frame consists of two parts, one horizontal, the other vertical. The carriage (B) is supported upon the horizontal part of the frame or rollers (a) which diminish the friction and therefore admit of its being operated more easily while carrying a heavy log. The upright frame (C) supports the saw (D) and the driving gear. The main driving shaft (b) is driven by any convenient prime mover, by which motion is imparted to it through a cog wheel (c) or a suitable pulley. The inner end of this shaft carries a crank-pin (e) on a disk (E), which may be made heavier on one side than on the other to counterbalance the saw for the purpose of equalizing the motion of the machinery. Toward the outer end of the shaft a grooved pulley (F) is mounted which transmits motion to a corresponding pulley (G) on a counter shaft (H) on one side of which a series of cog teeth (i) are formed, these teeth gear into and drive a wheel (I) which imparts motion to an inclined shaft (J) that carries an endless screw (K) to gear into a cog wheel (L) and drives the same. This wheel is mounted on a horizontal shaft (M) which carries a pinion (N) that takes into a rack (P) on the underside of the carriage (B) so that as the pinion is turned by motion derived from the main shaft through the pulleys, wheels, and screw (K) the log on the carriage will be fed toward the saw. To reverse the motion of the log to prepare for a new cut the lower end of the screw shaft (J) is raised until the screw is drawn out of gear with the feed wheel (L) when a pinion by sliding its shaft endwise is thrown into gear with the feed wheel and imparts to it a motion the reverse of that given to it by the screw (K). This reverse gear shaft (Q) carries a grooved pulley (R) which is driven by a band that encircles it and a corresponding pulley on the main driving shaft. By driving the feed wheel (L) by the screw (K) and pinion (S) alternately, the carriage will be carried alternately in opposite directions, to feed the log up to the saw and to make one cut and carry it back again to be set and prepared for another cut.

The continuous screw feed is peculiarly suited to a portable sawmill as it carries the log forward equably and steadily without regard to variations in the resistance, whether caused by irregularities in the hardness of the wood, the unequal binding of the saw, or irregularities in the ways on which the carriage slides.

The saw is made of a stiff plate mounted and driven without a frame to render the apparatus as light as possible and thus render it more portable.

The saw, like all other saws which are mounted without a frame is secured at its lower end in a sliding stock (T) which moves between two guides. It is usual to construct this sliding-stock with a revolving crank by means of a pitman in order to give it an alternating motion to be transmitted to the saw; but as this mode of transmitting motion from the crank involves considerable vertical space it is highly objectionable in a portable mill which must be kept as near the ground as possible as well to facilitate the placing of logs to be sawed upon the carriage, as to lessen the strain upon the frame from the motion of the machinery, and consequently admit of a lighter and more portable frame being used. To attain this object so essential to a portable mill, I make a horizontal slot (d) in the stock (T) of the saw equal in length to the stroke of the crank-pin (e) and of the proper size for the latter to traverse it; this slot allows the crank to move horizontally, and the sliding up and down of the block allows the crank to move vertically, in this way the saw stock performs its own appropriate office and that of a pitman also. The upper end of the saw traverses a vertical slit (m) in a pendulum block (U) secured by a pivot (n) immediately over the saw and in the same plane:— this block extends downward as far as it can and clear the top of the largest logs which the mill is designed to saw. This block has also a vertical slot (*s*) at right angles to the slit (*m*) in which a cross head or bar (*w*) secured to the upper end of the saw traverses, to keep the saw vertical in one direction, while the slit keeps it on the opposite direction.

In case the saw is properly shaped and working well, it is plain that it will maintain a vertical position while at work, but if it should at any time tend to run slightly to one side as all saws do occasionally, the block (V) will yield by turning on its pivot (*n*) to allow the saw to move aside or to assume a curve in the log. By this means the binding and heating of the saw, the most obstinate difficulty in sawmills of this kind as heretofore constructed is avoided almost entirely.

Having thus described my improved portable sawmill what I claim therein as new and desire to secure by Letters Patent is—

The pendulum block to support and guide the upper end of the saw, substantially as described.

In testimony whereof, I have hereunto subscribed my name.

JOHN A. TAPLIN.

Witnesses:
 ISAAC C. WEED,
 P. H. WATSON.